United States Patent [19]
Garmire et al.

[11] Patent Number: 6,122,277
[45] Date of Patent: Sep. 19, 2000

[54] PARALLEL COMPUTER NETWORK BROADCASTING AND ACKNOWLEDGEMENT

[75] Inventors: Derrick Garmire; Donald G. Grice, both of Kingston, N.Y.; Tim Zhang, Spring, Tex.

[73] Assignee: International Business Machines Corporation, Armonk, N.Y.

[21] Appl. No.: 08/920,348

[22] Filed: Aug. 19, 1997

[51] Int. Cl.⁷ .............................. H04L 12/28; H04L 12/56
[52] U.S. Cl. .......................................... 370/390; 709/223
[58] Field of Search .................................. 370/235, 389, 370/223, 390, 400, 401, 402, 403, 404, 474, 406, 328, 449; 709/223, 250; 345/502; 714/748

[56] References Cited

U.S. PATENT DOCUMENTS

| | | | |
|---|---|---|---|
| 4,707,827 | 11/1987 | Bione et al. | 370/405 |
| 4,908,828 | 3/1990 | Tikalsky | 714/822 |
| 5,056,085 | 10/1991 | Vu | 370/400 |
| 5,088,091 | 2/1992 | Schroeder et al. | 370/406 |
| 5,109,384 | 4/1992 | Tseung | 714/748 |
| 5,117,420 | 5/1992 | Hillis et al. | 370/400 |
| 5,181,017 | 1/1993 | Frey, Jr. et al. | 709/239 |
| 5,216,675 | 6/1993 | Melliar-Smith et al. | 714/748 |
| 5,241,625 | 8/1993 | Epard et al. | 345/502 |
| 5,245,609 | 9/1993 | Ofek et al. | 370/235 |
| 5,379,295 | 1/1995 | Yonehara | 370/400 |
| 5,404,565 | 4/1995 | Gould et al. | 709/237 |
| 5,410,300 | 4/1995 | Gould et al. | 340/825.79 |
| 5,469,433 | 11/1995 | McAuley | 370/474 |
| 5,478,662 | 12/1995 | Strasser | 429/13 |
| 5,673,252 | 9/1997 | Johnson et al. | 370/449 |
| 5,764,895 | 6/1998 | Chung | 709/250 |
| 5,857,075 | 1/1999 | Chung | 709/223 |
| 6,049,533 | 4/2000 | Norman et al. | 370/328 |

*Primary Examiner*—Hassan Kizou
*Assistant Examiner*—John Pezzlo
*Attorney, Agent, or Firm*—Floyd A. Gonzalez, Esq.; Heslin & Rothenberg, P.C.

[57] ABSTRACT

Received portion of message is stored persistently and transmitted without awaiting receipt of another portion of the message and without generating a new message. The storing and transmitting can occur substantially simultaneously and be performed by one or more hardware elements. Originator of the message can choose whether to indicate indication of broadcasting of the message. First hardware element can determine local acknowledgement for message and second hardware element can determine determinative signal of the local acknowledgement and at least one of: one or more collected intended recipient acknowledgements for the message; and one or more collected determinative signals of intended recipient acknowledgements for the message.

13 Claims, 5 Drawing Sheets

FIG. 1A
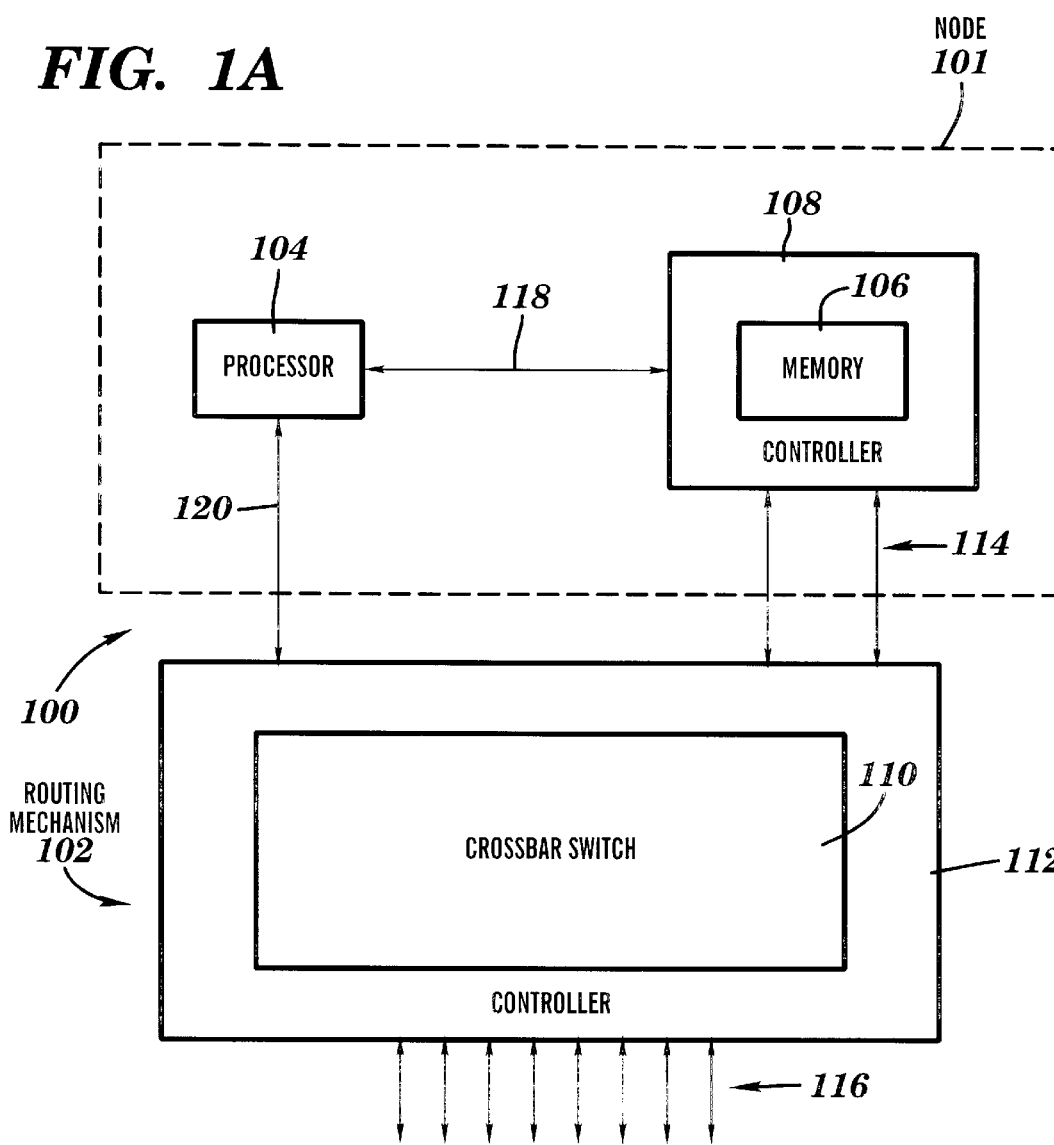
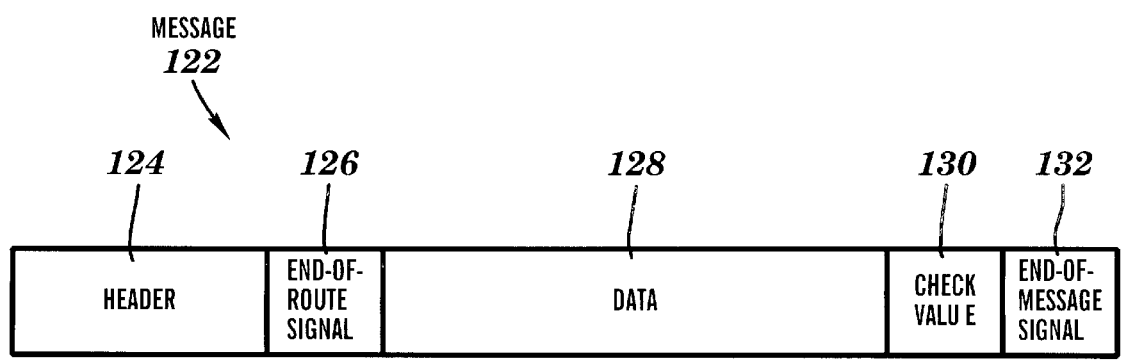
FIG. 2

PARALLEL COMPUTER NETWORK BROADCASTING AND ACKNOWLEDGEMENT

TECHNICAL FIELD

This invention relates, in general, to parallel computer network communication and, in particular, to broadcasting and acknowledgement of a message in a parallel computer network.

BACKGROUND ART

A parallel computer network often encompasses communication among a number of nodes. One example of a parallel computer network is a multiple instruction streams, multiple data streams ("MIMD") computer. Each node usually has a processor coupled to a memory. Typically, the nodes operate independently and interact with each other by sending and receiving messages or blocks of data.

Practicability dictates every node cannot have a dedicated link to the thousands of other nodes in a large parallel computer network or system. Rather, the system usually interconnects the nodes in a regular topology or structure, such as a ring, tree, or multi-dimensional mesh or torus. Generally, each node has a direct link to only a few of its neighboring nodes. Data communication between nodes without direct links utilizes intermediate nodes.

A node that originates a message can address the message to a single recipient or to multiple recipients. Namely, an individual-addressee message has a single intended recipient. Further, when the originating node intends to send particular data to a number of other nodes, the originator can send a broadcast message, rather than send separate individual-addressee messages to each of the nodes. Moreover, a broadcast message can be selective (so it has specific, multiple intended recipients) or be network-wide.

In one known individual-addressee communication design, a routing mechanism associated with each node interfaces that node with the computer network. Furthermore, a routing mechanism (associated with an intermediate node) both receives data from a preceding routing mechanism and also transmits the data to another routing mechanism in a byte-by-byte fashion. Moreover, an intermediate routing mechanism relays an acknowledgement from a subsequent routing mechanism to a preceding routing mechanism without taking any action. Such a design is disclosed in U.S. Pat. No. 5,181,017 to Frey, Jr. et al. (entitled "Adaptive Routing in a Parallel Computing System," issued Jan. 19, 1993, and assigned to International Business Machines Corporation), which is hereby incorporated herein by reference in its entirety. A shortcoming of this design, however, is the inability of any routing mechanism to transmit a portion of, for instance, a broadcast message to another node before storing the entire message in memory of a local node. A further shortcoming is the inability of an intermediate routing mechanism to take any action concerning acknowledgement of a message, for instance, during broadcasting.

During one common type of broadcasting, the originator serially sends its broadcast message to its linked set of nodes. Next, after receiving the entire message, each node of the set runs software to process and store the broadcast data. Then, each of these nodes serially sends out to its linked nodes in the network a new message containing the broadcast data. Eventually, all the nodes contain a copy of the serially processed-stored-forwarded data. A shortcoming of this arrangement is the inability of an intermediate node to transmit any of the data to another node before receipt of the entire message. A further shortcoming is the inability of the intermediate node to communicate received data without generating a new message. Another shortcoming is the inability of the intermediate node to store any portion of the data in its local node memory and transmit the portion to another node on a portion-by-portion basis.

In another known configuration, a routing mechanism (in a network in which nodes and routing mechanisms are associated one-for-one) collects subsequent intended recipient acknowledgement information for an individual-addressee node message and returns the status to a preceding routing mechanism (toward the originator). Such a design is disclosed in U.S. Pat. No. 5,404,565 to Gould et al. (entitled "Message Tracking in a Parallel Network Employing a Status Word at Each Node Which Reflects a Message's Progress," issued Apr. 4, 1995, and assigned to International Business Machines Corporation), which is hereby incorporated herein by reference in its entirety. A shortcoming of this configuration is the inability of the routing mechanism to return to a preceding routing mechanism a status of whether a broadcast message has been received by its local associated node in addition to a number of other nodes. Another shortcoming is the inability of an intermediate routing mechanism to transmit any of the data to another routing mechanism before receipt of the entire message. An additional shortcoming is the inability of any routing mechanism to substantially simultaneously store in its local node and transmit to another routing mechanism a received portion of a broadcast message.

Thus, a need exists for a capability that provides storing of data of a message in memory of a local node and transmitting of the data toward another node before receipt of the entire message. An additional need exists for a technique that allows transmission of received broadcast data toward another node without generating a new message. A further need exists for a capability that provides transmission of a portion of a broadcast message to another node before storing the entire message in memory of a local node. Another need exists for a technique that allows intermediate routing mechanism action concerning acknowledgement of a broadcast message. A still further need exists for a capability that provides return by one routing mechanism to its preceding routing mechanism of a status whether a broadcast message has been received by its local associated node in addition to a number of other nodes.

SUMMARY OF THE INVENTION

The shortcomings of the prior art are overcome and additional advantages provided through the provision of a messaging capability in which a received portion of a message is stored persistently and transmitted without awaiting receipt of another portion of the message. The storing and transmitting of the received portion of the message can occur substantially simultaneously. Also, one or more hardware elements can perform the storing and transmitting.

Additionally, the storing of the received portion can occur in response to an indication of broadcasting of the message. An originator of the message can choose whether to indicate the indication of broadcasting. For example, the originator can insert the indication into the message.

The persistent storing of the received portion of the message can occur in local memory. Further, a routing mechanism can perform the transmitting of the received portion.

The transmitting of the received portion can occur on one or more paths toward one or more intended recipients. Also, the transmitting can occur in response to routing information for the message.

In another embodiment of the present invention, a received portion of the message is stored and transmitted without generating a new message.

In another aspect of the invention, a first hardware element determines a local acknowledgement for a message. Also, a second hardware element determines a determinative signal of the local acknowledgement and at least one of: one or more collected intended recipient acknowledgements for the message; and one or more collected determinative signals of intended recipient acknowledgements for the message.

The determining of the local acknowledgement can occur according to whether an indication of broadcasting appears for the message. Further, the determining of the determinative signal can occur according to whether the indication appears for the message.

The second hardware element can transmit the determined determinative signal on a path toward an originator of the message. Moreover, the first hardware element can be a controller of local memory. Further, the second hardware element can be a controller of a routing mechanism. Alternatively, the first hardware element and the second hardware element can be the same hardware element.

In yet another aspect of the present invention, a hardware element determines a determinative acknowledgement signal for a subset of a plurality of intended recipients for a message broadcast from an originator. Further, the hardware element transmits the determinative acknowledgement signal on a path toward the originator.

The present invention advantageously provides a message broadcast capability where data of a message can be stored in memory of a local node and transmitted toward another node before receipt of the entire message. Additionally, the technique of the present invention allows transmission of a portion of a broadcast message toward another node before storage of the entire message in memory of a local node. Furthermore, the present invention provides storage in local node memory of a portion of a broadcast message and transmission of the same toward another node without generating a new message. Also, the technique of the present invention allows a received portion of a broadcast message to be substantially simultaneously stored in the memory of the local node and transmitted toward another node. Moreover, the present invention provides an acknowledgement determination capability where an intermediate routing mechanism can act concerning acknowledgement for a broadcast message. Moreover, the technique of the present invention allows a given routing mechanism to return a status to a preceding routing mechanism whether a broadcast message has been received by its local associated node in addition to a number of other nodes.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

FIG. 1A depicts one example of a node and its associated routing mechanism suited for use in numerous embodiments of, for instance, four-dimensional mesh or torus topologies for various computer systems or networks incorporating and using the broadcast and acknowledgement capabilities of the present invention;

FIG. 2 represents one example of a message arranged in accordance with an exemplary protocol used by the node and its associated routing mechanism of FIG. 1A;

BEST MODE FOR CARRYING OUT THE INVENTION

Figure 1B:
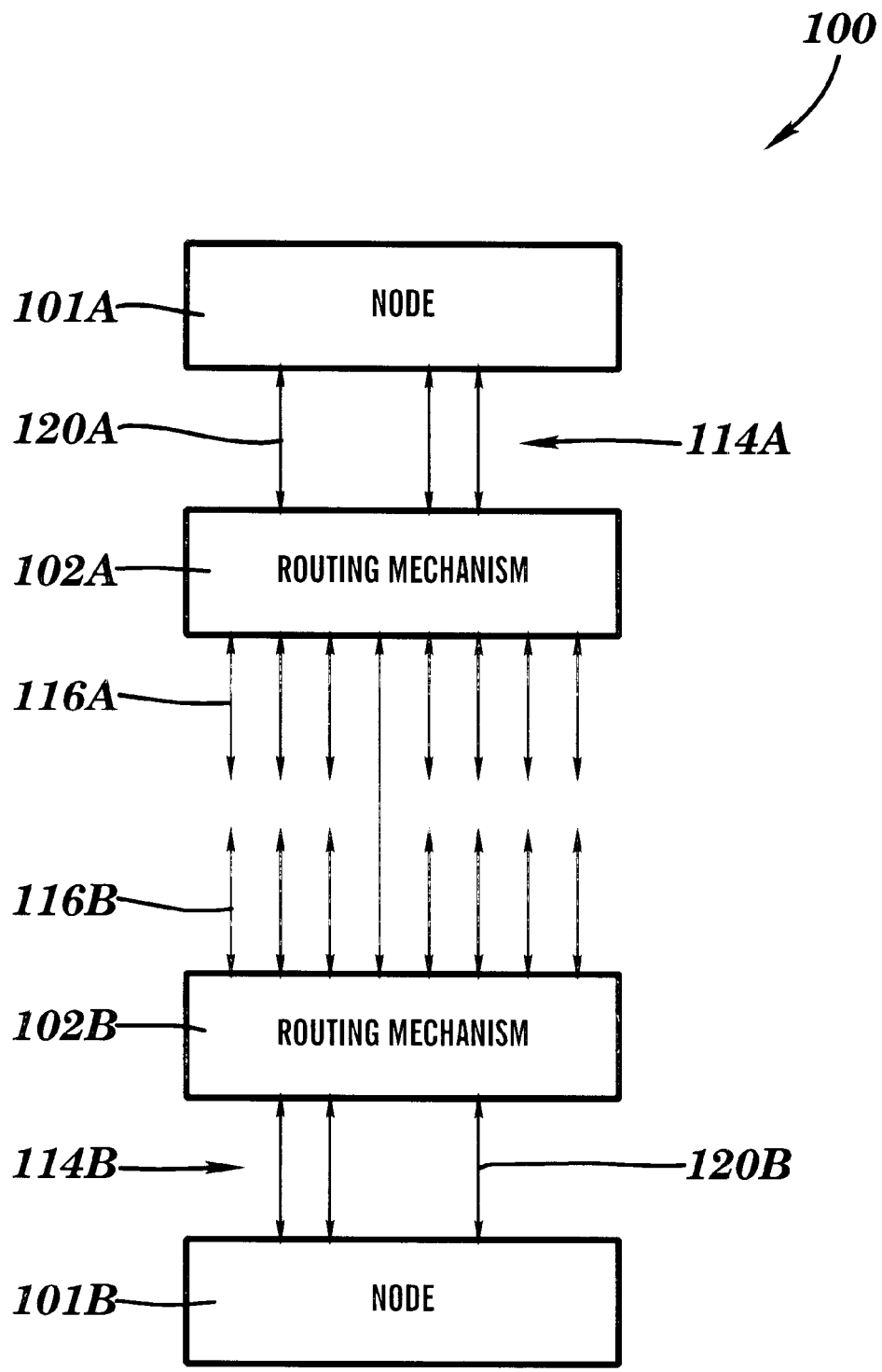
FIG. 1B depicts one example of multiple occurrences of the node and its associated routing mechanism of FIG. 1A and interconnections between the same, in accordance with the principles of the present invention.

In accordance with the principles of the present invention, a message broadcast capability is provided in which data of a message can be stored in memory of a local node and transmitted toward another node before receipt of the entire message. Also, a portion of a broadcast message can be transmitted toward another node before storing the entire message in memory of a local node. Additionally, a portion of a broadcast message can be stored in local node memory and transmitted toward another node without generating a new message. Furthermore, a received portion of a broadcast message can be substantially simultaneously stored in the memory of the local node and transmitted toward another node. Also, an acknowledgement determination capability provides action by an intermediate routing mechanism concerning acknowledgement for a broadcast message. Moreover, a given routing mechanism can return a status to a preceding routing mechanism whether a broadcast message has been received by its local associated node in addition to a number of other nodes, as described herein.

One example of a node and its associated routing mechanism suited for use in numerous embodiments of a computer system or network incorporating and using the broadcast and acknowledgement capabilities of the present invention is depicted in FIG. 1A and described in detail herein.

In one embodiment, a computer system 100 includes a node 101 coupled to a routing mechanism 102. The node has a processor 104 coupled to a memory 106. The memory interfaces with the processor and the routing mechanism through its memory controller 108. The routing mechanism has a crossbar switch 110 coupled to a routing mechanism controller 112, which individually interfaces the routing mechanism with both the processor and also the memory controller.

In one example, each of controllers 108 and 112 is implemented using finite-state machines, by techniques which are well-known in the art. Preferably the controllers 108 and 112 are hardware elements. For instance, controllers 108 and 112 could be embodied as the same hardware element.

Further, routing mechanism 102 can be, for instance, a switch chip hardware element. In one preferred embodiment, crossbar switch 110 of the routing mechanism includes a distributed crossbar switching array, as disclosed in U.S. Pat. No. 5,410,300 to Gould et al. (entitled "Distributed Crossbar Switch Architecture," issued Apr. 25, 1995, and assigned to International Business Machines Corporation), which is hereby incorporated herein by reference in its entirety.

As depicted in FIG. 1A, one or more bidirectional memory links 114 interconnect memory controller 108 and routing mechanism 102. In particular, each memory link could service a separate message communication request to an individual node 101. Further, one or more bidirectional communication links 116 interface the routing mechanism with the remainder of the computer network. These concepts are further described in the above-referenced and incorporated U.S. Pat. No. 5,181,017.

A bus 118 (e.g., any selected number of wires) can interconnect processor 104 and memory controller 108. Additionally, a bus 120 can interconnect the node processor and its associated controller 112 of routing mechanism 102. Buses 118, 120 are each sized appropriately for communication of electrical signal information. As is well-known in the art, an implementation of a given computer system can use multiple parts of a given bus as though the parts constituted separate buses.

For multi-dimensional torus topologies, a given network node 101 is associated with two communication links 116 for each dimension of the torus, as is well-known in the art and further described in the above-referenced and incorporated U.S. Pat. No. 5,181,017. For exemplary purposes, FIG. 1A illustrates eight communication links 116 associated with the node for use in one preferred embodiment of a four-dimensional torus topology. of course, one could easily employ the node in the interior of a four-dimensional mesh topology (which has just as many connections as any arbitrary node in the four-dimensional torus topology). Those skilled in the art commonly distinguish mesh and torus topologies on the basis of the torus topology having, and the mesh topology lacking, wraparound connections between the nodes at its "ends." Naturally, one could easily employ in any position in the network a node having an overabundance of communication links for that position simply by leaving the excess communication links unconnected in the network. Furthermore, one can practice the present invention with network topologies exhibiting symmetry or appropriate degrees of asymmetry, as desired.

FIG. 1B depicts one example of multiple nodes 101A, 101B coupled to one another by their respective routing mechanisms 102A, 102B. In particular, each communication link 116A of a given routing mechanism 102A can be connected to another communication link 116B of different routing mechanism 102B. As will be comprehended by those skilled in the art, the remaining seven links 116A and remaining seven links 116B (depicted in FIG. 1B for exemplary connectability in four-dimensional mesh or torus topologies) are each individually connected to one communication link on a unique routing mechanism associated with a distinct node, in one preferred embodiment.

Preferably, each communication link (e.g., 116A or 116B) includes a "receiver-transmitter" pair. Also, each memory link (e.g., 114A or 114B) includes an "injector-extractor" pair. The "injector" is a special receiver that receives a portion of message 122 from local node 101. In contrast, the "receiver" receives a portion of the message from another routing mechanism 102. Furthermore, the "extractor" is a special transmitter that sends a portion of the message to the local node. Moreover, the "transmitter" sends a portion of the message to another routing mechanism.

Returning to FIG. 1A, crossbar switch 110 allows one-to-many connections, in accordance with their availability. For instance, the crossbar switch permits connections from a "receiver" or "injector" to a number of the "transmitters" and/or the "extractor." These concepts are further described in the above-referenced and incorporated U.S. Pat. No. 5,181,017 and U.S. Pat. No. 5,410,300.

FIG. 2 represents an exemplary illustration of a communication vehicle for one example of a network protocol for information transfer. The nodes 101 (FIG. 1A) communicate among each other in the network by sending and receiving packets or messages 122. In one embodiment, the message includes a header 124, an end-of-route signal 126, data 128, a check value 130, and an end-of-message signal 132, each of which is described herein. Typically, header 124 contains routing information, as described herein. In one broadcast example of the present invention, end-of-route signal 126 is a broadcast signal, descriptively named an "end-of-broadcast" signal because it assumes the position of the end-of-route signal at the end of the header. Data 128 constitute information the originator wishes to communicate to one or more other nodes. Check value 130 can represent, for example, a cyclic redundancy check or any other error detection and/or correction scheme well-known to those skilled in the art. End-of-message signal 132 indicates the conclusion of the message. Further details of many of the components of the message (plus implementation of the end-of-message signal as a separate control wire command) are described in the above-referenced and incorporated U.S. Pat. No. 5,181,017.

In one preferred embodiment, components 124, 126, 128, 130, and 132 of each message 122 are sized to have easily manageable lengths, such as integral numbers of eight bit bytes. Furthermore, transmission of the message preferably proceeds in byte-size portions from the left-hand side to the right-hand side of FIG. 2. In one alternative embodiment, the transmitted portions could easily be of any desired size.

In one example, each of links 114, 116 (FIG. 1A) include an eight wire bus for parallel communication of succeeding eight bit bytes of message 122. Alternatively, the links could easily include a bus of integer times eight width, or multiple eight bit byte buses, for parallel transmission of succeeding blocks of multiple bytes (e.g., words) of the message.

As represented in FIGS. 1A–2, nodes 101 with associated routing mechanisms 102 of the present invention can advantageously choose to send a flooding broadcast message, a selective broadcast message, or an individual-addressee message, as described herein. For instance, when processor 104 of a given originator node 101 wishes to send message 122 to multiple connected nodes, it inserts an end-of-broadcast character in the position of end-of-route signal 126, in accordance with the present invention. In particular, the end-of-broadcast character inserted in the position of end-of-route signal 126 directs each routing mechanism 102 to allocate one memory link 114, as described in the discussion of FIG. 3 herein.

In one preferred embodiment of a flooding broadcast, processor 104 of originator 101 further inserts in header 124 of message 122 routing information that causes controller 112 of routing mechanism 102 to attempt allocating all of its communication links 116. The details of insertion and use of routing information in the header are described in the above-referenced and incorporated U.S. Pat. No. 5,181,017. Thereafter, each received portion of the message can be stored in local memory 106 and transmitted toward the routing mechanisms of the other intended recipient nodes, as described herein.

In accordance with the present invention, each routing mechanism 102 can persistently store a portion of broadcast message 122 in its local node 101 and transmit the same toward other nodes without awaiting receipt of another portion of the message, as described herein. In one example, each of multiple desired portions of the message is written to its own assigned address space upon receipt. So, a previously received portion is not overwritten by a subsequently received portion (even though broadcasting of the message occurs on a portion-by-portion basis). Upon completion of a successful broadcast network-wide, a copy of all of the desired portions of the message advantageously exists in memory 106 of each local node. In accordance with the present invention, all desired portions of the message remain in local memory for use by its local node. In particular, the local node has use of a "persistent" copy (e.g., in its local memory) of each and every portion of, for instance, data 128 (e.g., after memory controller 108 has checked and discarded check value 130). Of course, the local node can thereafter do with the stored portions as it sees fit, including delete all those portions from its local memory. The key is the local node has at its disposal all of the desired portions. "Persistent" storing indicates no desired portion of the message is overwritten or otherwise deleted from the local memory in order to receive any other such portion. That is, no deletion takes place independent from the wishes of the local node.

Further in accordance with the present invention, each routing mechanism 102 can advantageously store information from broadcast message 122 in its local node 101 and transmit the same toward other nodes before receiving the entire message and without generating a new message. For example, once the broadcast paths are opened, no intermediate node assembles a new header 124 for continued storage and propagation of each received portion of the broadcast message. Further, no intermediate node accumulates portions of the original broadcast message in order to assemble a new message for continuation of the broadcast. Therefore, each node processor 104 need only concern itself with its own delivered portions of the broadcast message. After the originator presents the broadcast message to the network, the routing mechanisms desirably handle progression and propagation of the broadcast information without requiring attention from other node processors, as described herein. This advantageously yields decreased processor resource use cost and increased broadcast message network transmission speed.

In another aspect of the present invention, originator 101 achieves selective broadcasting of message 122 by including routing information in header 124 that corresponds to only selected destination nodes. The end-of-broadcast character inserted in the position of end-of-route signal 126 still directs each routing mechanism 102 to allocate one memory link 114 in addition to communication links 116 allocated according to the routing information in the header.

In one alternative embodiment of the present invention, the end-of-broadcast character easily could direct controller 112 of routing mechanism 102 to allocate not only the one memory link 114 (as above), but also each and every one of communication links 116. Namely, the end-of-broadcast character in the position of end-of-route signal 126 easily could further direct allocation of any and all communication links that had not yet been allocated by any routing information that may appear in header 124. In fact, this flooding broadcast could then omit the header. So, originator 101 would not need to insert routing information in the form of the header in order to send a flooding broadcast message because the interpretation of the end-of-broadcast character in this implementation would effect a request for allocation of all links 114, 116 on each routing mechanism it encounters. Then, the end-of-broadcast character could appear at the leading edge of message 122, or at least further theretoward, in order to achieve incrementally faster broadcasting network-wide.

Figure 3:
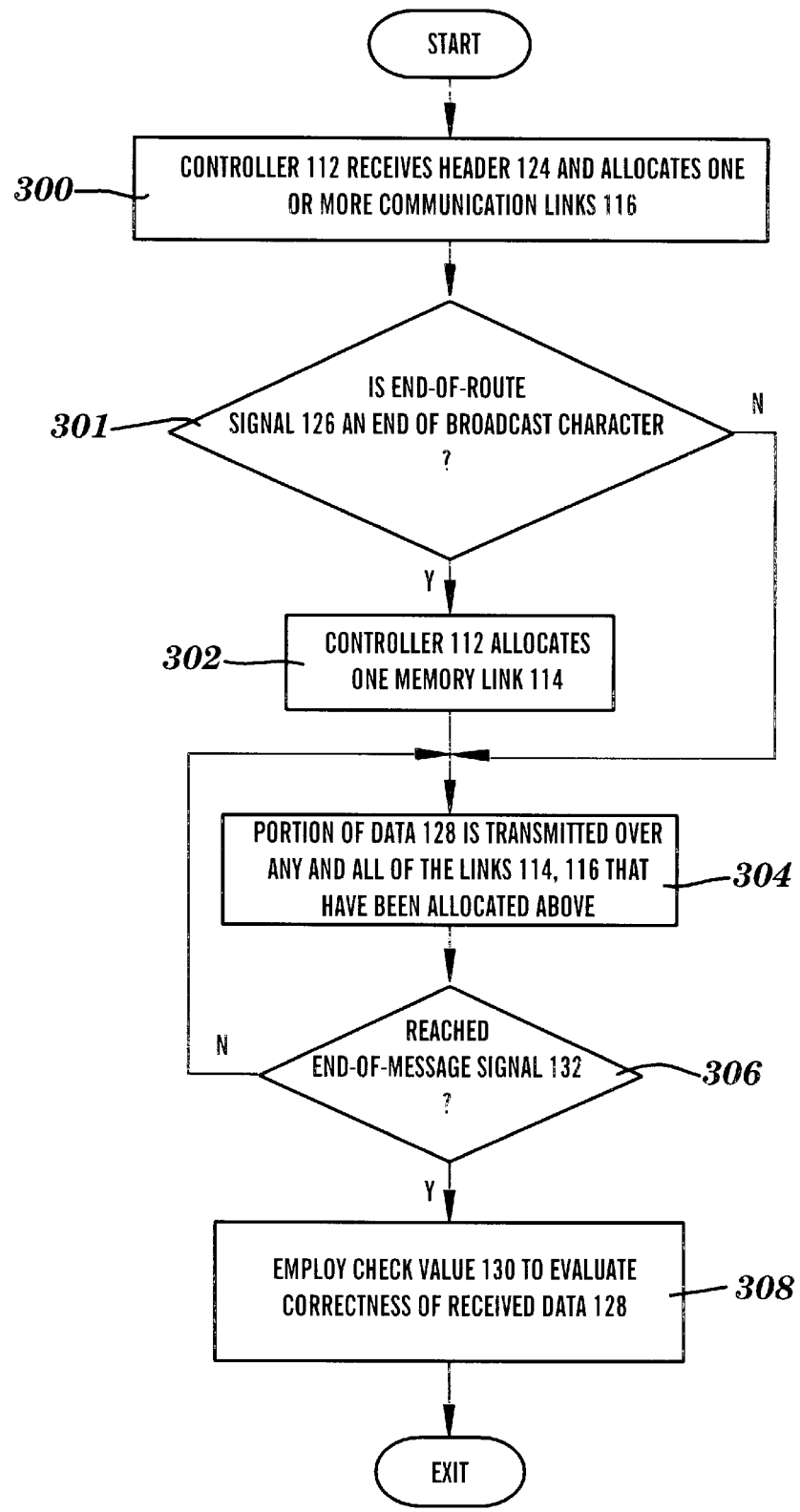
FIG. 3 depicts one embodiment of the logic used by a controller of the routing mechanism of FIG. 1A to achieve progression and appropriate propagation of a message, in accordance with the principles of the present invention.
Figure 4:
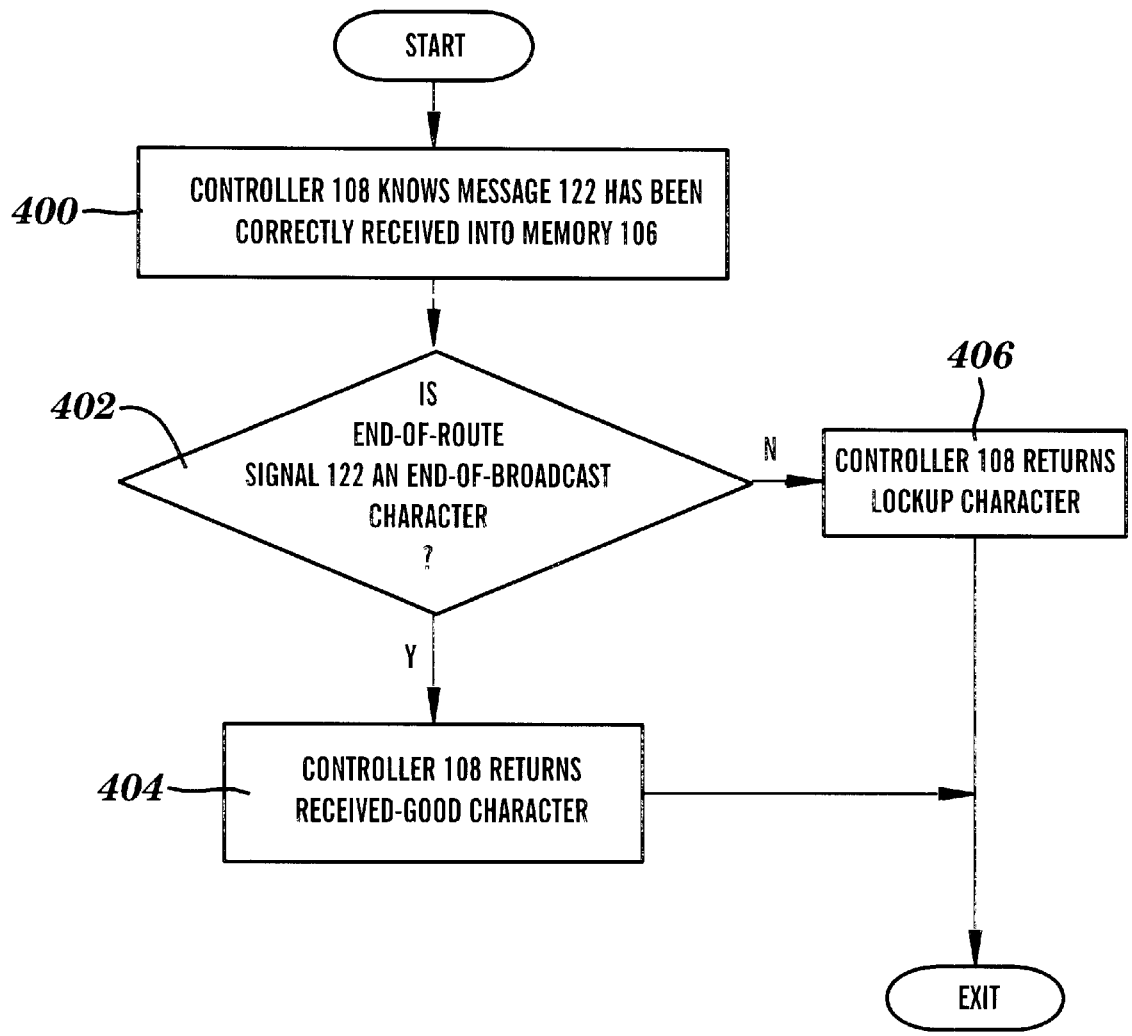
FIG. 4 depicts one embodiment of the logic used by a memory controller of a local node to accomplish acknowledgement for a broadcast message to the routing mechanism of FIG. 1A, in accordance with the principles of the present invention.
Figure 5:
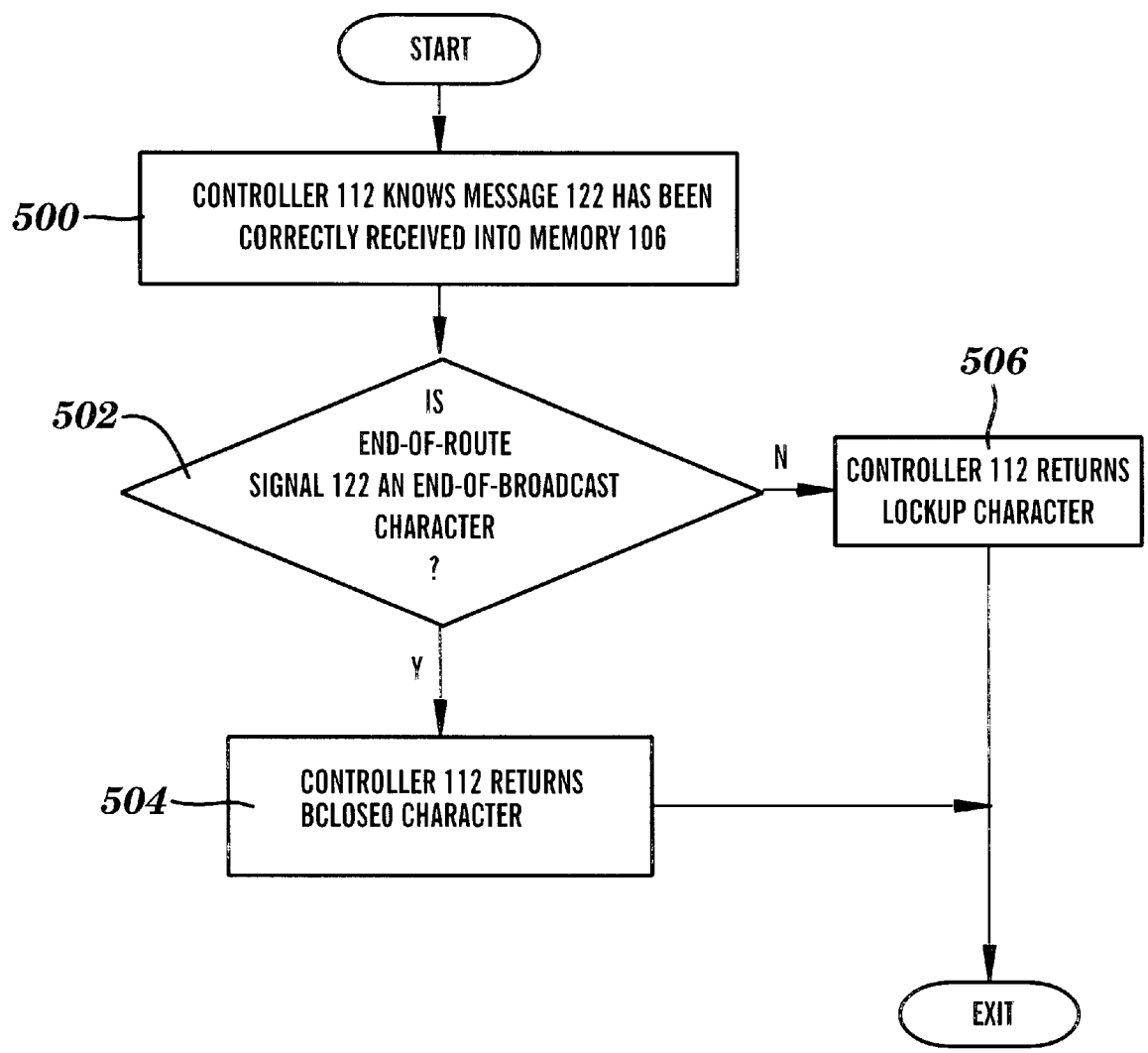
FIG. 5 depicts one embodiment of the logic used by the controller of the routing mechanism of FIG. 1A to accomplish acknowledgement for a broadcast message along a path toward an originator, in accordance with the principles of the present invention.

FIGS. 3–5 represent reaction by each of controllers 108, 112 to the end-of-broadcast character having been inserted for end-of-route signal 126 in order to accomplish a broadcast.

As represented in FIG. 3 for progression of message 122 along a forward path (a path in the network from originator node 101 toward one or more intended recipient nodes), at STEP 300 controller 112 of routing mechanism 102 receives message header 124 and consequently attempts to allocate one or more communication links 116, as described herein. In accordance with the present invention, at INQUIRY 301 and STEP 302 if end-of-route signal 126 is an end-of-broadcast character, the routing mechanism controller also attempts to allocate one memory link 114 (in addition to the one or more communication links allocated above). In one example, the end-of-broadcast character causes the routing mechanism to open the "extractor" of one memory link. In embodiments having multiple memory links 114 (e.g., as depicted in FIG. 1A) between a given routing mechanism and its local associated node, controller 112 merely attempts to allocate any one memory link 114 that happens to be available at the particular moment. The use of "attempts" in this description reflects a recognition that links 114, 116 may be temporarily or continuously busy, disabled, or otherwise occupied. In one example, appropriate acknowledgements indicate or otherwise provide alerts to such unavailabilities of the links, as described herein.

At STEP 304, and at each repetition of STEP 304 encountered after INQUIRY 306 (which is described herein), each received portion of data 128 is transmitted over all of links 114, 116 that were allocated above (STEPS 300, 302) for this message 122, in accordance with the present invention. Moreover, the transmission of each data portion through routing mechanism 102 (by its controller 112 using crossbar switch 110) occurs substantially simultaneously. In one preferred embodiment, the present invention accomplishes broadcasting of the message in a portion-by-portion fashion at each routing mechanism by transmitting each received portion into its own local node memory 106 as well as toward one or more other routing mechanisms. In one example, a flooding broadcast transmits each received portion of the message over one link 114 plus all of the links 116.

Therefore, after connection of the links 114, 116 in the broadcast paths, each routing mechanism 102 along each broadcast path can substantially simultaneously store and transmit each portion of broadcast message 122 immediately upon receipt of the portion, as described herein. So, a given routing mechanism desirably can store and transmit any received portion of a broadcast message without awaiting receipt of another portion of the message.

Any given routing mechanism 102 participating in the broadcast has multiple active paths over multiple links 114, 116, including link 114 into its local memory. This process desirably repeats at all of the connected routing mechanisms in order to effect portion-by-portion (e.g., byte-by-byte) storage at each network node of, for instance, data 128. Therefore, broadcasting of the message advantageously occurs network-wide with only the serial delays for procession by each routing mechanism through header 124 to reach the end-of-broadcast character (e.g., at the position of end-of-route signal 126) plus the parasitic delays of links 114, 116.

In one embodiment, controller 112 of routing mechanism 102 examines or scrutinizes each portion of message 122 it receives across communication link 116. Further, controller 108 of memory 106 of node 101 examines or scrutinizes each portion of the message it receives across memory link 114. At INQUIRY 306 the memory controller waits for end-of-message signal 132 in order to recognize that the message has concluded. In one example, this conclusion of the message as signalled by the end-of-message signal also signals that the penultimate portion received was check value 130. At STEP 308 the memory controller employs this check value to evaluate the correctness or incorrectness of data 128 it has received. In other embodiments, the routing mechanism controller could employ the check value to perform its own evaluation of the data and/or either or both of controllers 108, 112 could employ the check value to evaluate various portions of the message, including the message in its entirety.

In one example, at least a few commands or signals, in addition to messages 122, can be sent forward and backward over links 116 and routing mechanisms 102. For instance, such commands or signals can take the form of acknowledgements, as described herein. Further, the commands could travel over links 114. One preferred embodiment implements these commands as special escape characters distinct from the messages. Alternatively, one could easily implement these commands using separate control wires.

Furthermore, upon opening of a path ("forward") from an originator node 101 to any given destination node, the present invention preferably also opens a path ("backward") from the destination node to the originator node. In one example, the particular message travels along the forward path and commands (e.g., acknowledgements) relating to that message travel along the backward path. One embodiment of the present invention does not reserve the forward and backward paths exclusively for any particular message. For example, other messages appearing in the network could travel along any part of the backward path. Plus, commands relating to matters other than the particular message could travel along any part of the forward path.

FIGS. 4–5 represent examples of the logic used by controllers 108, 112 (FIG. 1A) to accomplish acknowledgement for broadcast message 122 (FIG. 2) on a path toward originator 101 (FIG. 1A), as described herein.

Referring to FIG. 4 for a discussion of an exemplary embodiment of controller 108 for memory 106 of node 101 (FIG. 1A), at STEP 400 controller 108 (FIG. 1A) determines that its memory has correctly received broadcast message 122 (FIG. 2), for instance, by employing message check value 130 (FIG. 2), as described above. While the following description presumes correct delivery of the message into local memory, the reader should note that the discussion further below concerning acknowledgement along a backward path describes activity in the event of incorrect delivery of the message into the local memory.

In accordance with the present invention, after the message has been correctly received into its memory, controller 108 (FIG. 1A) notes whether an end-of-broadcast character appears in the position of end-of-route signal 126 (FIG. 2), INQUIRY 402. If the end-of-broadcast character appears (to indicate the message is for broadcasting), then the memory controller returns a RECEIVED-GOOD character over memory link 114 (FIG. 1A) to routing mechanism 102, STEP 404. On the other hand, if the end-of-route signal does not include the end-of-broadcast character (because the message is for an individual-addressee node), the memory controller returns a LOCKUP character and thereby treats the message as an individual-addressee message, STEP 406. The routing mechanism will subsequently use the RECEIVED-GOOD or LOCKUP characters, as described below.

Similarly to the behavior depicted in FIG. 4 for controller 108 of memory 106, FIG. 5 depicts that controller 112 of routing mechanism 102 (FIG. 1A) communicates a status of receipt for message 122 (FIG. 2) according to its nature as a broadcast or individual-addressee message. In particular, at STEP 500 controller 112 (FIG. 1A) knows that the memory of local associated node 101 (FIG. 1A) has correctly received broadcast message 122 (FIG. 2), for instance, by an acknowledgement (e.g, a RECEIVED-GOOD character) delivered by the memory controller over memory link 114 (FIG. 1A). Next, controller 112 notes whether an end-of-broadcast character appears in the position of end-of-route signal 126 (FIG. 2), in accordance with the present invention, INQUIRY 502. If the end-of-broadcast character appears (in order to indicate the message is for broadcasting), then the routing mechanism controller returns a BCLOSE0 character (as described herein) over communication link 116 (FIG. 1A) to its preceding routing mechanism along a network path toward originator 101 (FIG. 1A) of the message, STEP 504. Furthermore, without the end-of-broadcast character in the message (because the message is for an individual addressee), the routing mechanism controller returns a LOCKUP character and thereby treats the message as an individual-addressee message, STEP 506.

The present invention employs the above-described individual positive status acknowledgements described with respect to FIGS. 4–5, as well as negative status acknowledgements, in order to determine a determinative status of broadcast message receipt, as described below.

In one broadcast example, each network path that is opened for storage and propagation of message 122 (from originator 101 to its intended recipient nodes 101) remains open until completion of delivery of the message. After completion of delivery of the message and checking of its accuracy (e.g., by employing check value 130), an acknowledgement is returned backward along each path, as described herein. Next, each broadcast path incrementally and progressively dismantles along the network paths from the recipients who last receive the message toward the originator. At each network step from a given routing mechanism 102 to its preceding routing mechanism along each of the network paths, the routing mechanism along a given network path pools or collects the acknowledgements (e.g., BCLOSE0, as described herein) sent from the one or more routing mechanisms of nodes subsequent to itself during this dismantlement process. Further, the given routing mechanism additionally receives an acknowledgement from its own local node memory 106 (e.g., RECEIVED-GOOD, as described above). This routing mechanism, which is temporarily at the end of a network path (due to the ongoing dismantlement), determines a determinative signal from the acknowledgements for the subsequent routing mechanisms and its local node memory. For instance, the determinative signal can take the form of an acknowledgement that reflects the status (e.g., any failure) of the broadcast message in receipt by the local associated node memory in addition to all of the intended recipient nodes (according to the information relayed by each of their associated routing mechanisms), as described herein.

In one embodiment, each intermediate routing mechanism 102 sends backward its determinative acknowledgement and thereafter contributes to the dismantlement of its own portion of a given network path only after that particular intermediate routing mechanism has received or determined an acknowledgement for each path originally opened for subject broadcast message 122. In one example, each intermediate routing mechanism simply awaits an acknowledgement along each communication link 116 opened for the subject broadcast message. In another example, one or more intermediate routing mechanisms employ one or more timers (not shown) that designate a negative acknowledgement for a given communication link that was opened, but failed to return an acknowledgement for the subject broadcast message before expiration of a selected time interval. So, each intermediate routing mechanism determines a determinative status of receipt of the broadcast message by itself as well as the intended recipients subsequent to itself along one or more paths passing through itself from originator 101, in accordance with the present invention. Further, the originator node will receive a determinative status of receipt for the broadcast message by all nodes connected in the network, as described herein. Therefore, the originator desirably learns whether or not all of the intended recipient nodes connected in the network actually received the broadcast message.

In addition to the above, routing mechanism controller 112 (FIG. 1A) includes a capability to detect duplicate messages (in addition to its ability to react to the above-mentioned end-of-broadcast character in the position of end-of-route signal 126). In particular, the capability to detect duplicate messages records whether the routing mechanism controller has already seen a given broadcast message 122 come in through one of communication links 116. In one example, controller 112 of routing mechanism 102 sets a "state" bit (e.g., upon its initial encounter of end-of-broadcast character in the position of end-of-route signal 126) when a broadcast is underway. (In this one example, only one broadcast can occur in the system at any given time.) Thereafter, if the routing mechanism controller sees a duplicate of that particular broadcast message attempt entry on another communication link, the controller 112 will recognize the message and return a positive acknowledgement (e.g., BCLOSE0, as described herein) along that communication link in order to effect proper acknowledgement of that message. Namely, as far as that second-in-time communication link knows, the message is already being properly received by the intended node along the first-in-time communication link. Of course, any failure in delivery of the first-in-time message would be acknowledged along the first-in-time network path, as described herein.

For purposes of illustration, one can consider a design that lacks the above-described capability of the present invention to detect duplicate messages 122. For this example, in contrast to the present invention, routing mechanism controller 112 could incorrectly return a negative acknowledgement (e.g., BCLOSE1, as described herein) along a second-in-time requesting communication link 116 for a broadcast message that was in fact truly undergoing proper transmission over the first-in-time communication link. In contrast, the present invention provides the capability to detect duplicate messages in order to desirably prevent delivery of a negative acknowledgement where an attempted duplicate delivery of a broadcast message warrants a positive acknowledgement along a second-in-time network path.

As described herein, the present invention advantageously provides broadcasting storage, propagation, and acknowledgement as well as individual-addressee message procession and acknowledgement, as selected by originator 101 (FIG. 1A). The details of individual-addressee message procession and acknowledgement are described in the above-referenced and incorporated U.S. Pat. No. 5,181,017 and U.S. Pat. No. 5,404,565.

In accordance with the present invention, the same network can be used to provide either broadcasting or individual-addressee messaging. Along the forward path, the present invention provides storage and propagation of message 122, as described herein. Along the backward path, the present invention gives different interpretations to the acknowledgement characters according to the selected type of messaging. In one preferred embodiment, originator node 101 assigns a value to end-of-route signal 126 in order to select either broadcasting or else individual-addressee messaging, as described herein. This concept of activity based on interpretation of values according to context will be readily understood by those skilled in the art.

Along the backward path during broadcasting, the above-mentioned BCLOSE0 character signifies successful delivery to all intended recipient nodes 101 connected in the network. Further, a BCLOSE1 character signifies unsuccessful delivery to at least one intended recipient node connected in the network.

In accordance with the present invention, each routing mechanism 102 along any backward path for broadcasting combines the local node acknowledgement character with acknowledgement information for various numbers of subsequent intended recipients, as described herein. That is, each intermediate routing mechanism determines a determinative status of its own local node memory in combination with the intended recipients subsequent to itself along one or more paths passing through itself from the originator. For example, if an intermediate routing mechanism collects an acknowledgement of RECEIVED-GOOD ("positive") from its local node 101 and collects BCLOSE0 ("positive") from each routing mechanism connected subsequent to itself along a network path, the determinative status at that position in the broadcast path is BCLOSE0 ("positive"). Therefore, that routing mechanism will return BCLOSE0 to its preceding routing mechanism along the broadcast path. Conversely, if the intermediate routing mechanism receives either an acknowledgement from the local node that indicates a negative status (e.g., "BCLOSE1") or else BCLOSE1 ("negative") from any subsequent routing mechanism, then the intermediate routing mechanism will return an intermediate determinative status of BCLOSE1 ("negative"). In accordance with the present invention, the originator node will receive a determinative status for receipt of broadcast message 122 by all nodes connected in the network. Therefore, the originator desirably learns whether or not all of the intended recipient nodes connected in the network have actually received the broadcast message.

The discussion above has explained the meaning accorded the acknowledgement characters during broadcasting. Turning the focus of discussion now to acknowledgement during individual-addressee messaging in accordance with the present invention, "LOCKUP" ("positive") signifies availability of a path from originator node 101 to the intended recipient; "BCLOSE1" (a first degree of "negativity") signifies existence but unavailability of a path from the originator to the intended recipient; and "BCLOSE0" (a second, worse degree of "negativity") signifies non-existence of a path to the intended recipient. The reader should note "BCLOSE0" has starkly different meanings in the different contexts of broadcasting (where it is "positive") and individual-addressee messaging (where it is "negative"), as described herein.

In one example, when a given routing mechanism 102 attempts delivery of message 122 (either as a broadcast message or as an individual-addressee message), the routing mechanism queues up a BCLOSE1 ("negative") to be a default return acknowledgement signal along its network path toward originator 101, unless this default value is extinguished, as described herein. For a broadcast message, overall success in delivery extinguishes the default BCLOSE1 and returns instead the BCLOSE0 ("positive," broadcasting context), as described herein. For an individual-addressee message, successful delivery to the destination node extinguishes the default BCLOSE1 and returns instead a LOCKUP ("positive"). In one example, the LOCKUP character has an additional effect of deactivating all but a single network path, as is appropriate for an individual-addressee message. Consequently, in this one example, LOCKUP is not employed for broadcasting, since multiple active paths desirably remain open in order to accomplish a flooding broadcast. Of course, alternative embodiments of the present invention could easily employ any of a wide range of characters or variables with any number of meanings or interpretations.

In accordance with the present invention, controllers 108, 112 advantageously adapt to handle broadcasting or individual-addressee delivery of message 122 in response to whether or not the end-of-broadcast character appears in the position of end-of-route signal 126, as described above. Originator 101 triggers either broadcasting or else individual-addressee messaging by choosing whether or not to insert the end-of-broadcast character into the message. In one preferred embodiment, processor 104 of the originator inserts an end-of-header character in the position of end-of-route signal 126 in order to send an individual-addressee message. Of course, controllers 108, 112 can include any number of error detection and/or correction schemes for unexpected values of end-of-route signal 126 and combinations with various acknowledgement characters. The design of such remedies is well-known by those skilled in the art.

The network communication and broadcast acknowledgement capabilities of the present invention do not interfere with the operation of normal message routing. Also, these capabilities desirably increase speed of distribution for messages and decrease software overhead in the form of use of node processors. Furthermore, the present invention requires relatively little network cost of circuitry. Moreover, broadcasting and acknowledgement of a broadcast message advantageously can occur with little or no increase over the time required for delivery and acknowledgement of an individual-addressee message.

The description above of network-wide message broadcasting depicts a flooding message broadcast. This flooding provides an especially efficient broadcast in a controlled environment at times when no other network traffic is present. For instance, one could advantageously employ the flooding broadcast in a communications fabric designed to interconnect many processing elements for parallel work on large engineering/scientific, computationally intensive problems. For example, four-dimensional mesh or torus topologies provide desirable communications fabrics for a distributed database application.

In accordance with the present invention, originator node 101 of flooding broadcast message 122 will receive a determinative status in the form of an acknowledgement whether or not all the nodes connected in the network successfully received the message. Avoiding any assumptions about the completeness of the network makes this acknowledgement of the flooding broadcast robust. This lack of assumptions about connectedness of the nodes stems from the divergent interpretation of "BCLOSE0" according the context in broadcasting or individual-addressee messaging applications. In particular, the broadcast acknowledgement reports only with respect to nodes connected in the paths of communication. The flooding broadcast does not report failure to receive the message by nodes that are inaccessible because they are cut off from the network containing the originator by links that are busy, disconnected, or faulty. One could advantageously exploit this robustness by selectively partitioning the network through physical disablement of one or more links. An alternative to this flooding broadcast is a circular broadcast, as discussed below.

At an increased cost of network time, one could deliver to originator 101 a determinative status of whether each and every node of the network did in fact receive broadcast message 122. Namely, the originator could assemble routing information in header 124 to direct the activation of network paths that effectively connect all the nodes (and their associated routing mechanisms 102) in a chain. Then, message broadcasting and acknowledgement to the far end of the chain and back yields a definitive status, positive or negative, of network-wide receipt. In accordance with the present invention, the same hardware can support this circular broadcast as well as the flooding broadcast. Further, through the use of appropriate routing information, any given originator at any position in the network can advantageously select either type of broadcast at run-time.

Numerous alternative embodiments of the present invention exist. For instance, the computer network could easily exhibit any of numerous arrangements, including deviations from strictly mesh or torus topologies or modifications to other traditional structures in any of various dimensions. Further, any appropriate commands, signals, or characters, with or without messages 122, could easily be sent forward and backward over any of links 114, 116 and buses 118, 120. Also, one or more nodes 101 could easily omit any number, including all, of its one or more memory links 114 and as necessary route information for the node memory 106 through node processor 104. Similarly, one could easily route information for node processor 104 through node memory 106. Moreover, all nodes and routing mechanisms need not be identical, so long as at least a plurality of them can communicate under one given protocol (of course, additional common protocols would be employed as needed to at least incrementally, e.g., logically step-wise, connect a desired network).

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. An acknowledgement-determination method, comprising:

determining, by a first hardware element, a local acknowledgement for a message; and determining, by a second hardware element, an aggregate determinative signal to be further transmitted, said aggregate determinative signal being representative of:

said local acknowledgement; and at least one of:

one or more collected intended recipient acknowledgements for said message; and one or more collected determinative signals of intended recipient acknowledgements for said message.

2. The method of claim 1, wherein said determining of said local acknowledgement occurs according to whether an indication of broadcasting appears for said message.

3. The method of claim 2, wherein said determining of said aggregate determinative signal occurs according to whether said indication appears for said message.

4. The method of claim 1, further comprising transmitting, by said second hardware element, said determined aggregate determinative signal on a path toward an originator of said message.

5. The method of claim 1, wherein said first hardware element is a controller of local memory and wherein said second hardware element is a controller of a routing mechanism.

6. The method of claim 1, wherein said first hardware element and said second hardware element are the same hardware element.

7. A broadcast-acknowledgement method, comprising:

determining, by a hardware element, an aggregate determinative acknowledgement signal for a subset of a plurality of intended recipients for a message broadcast from an originator; and transmitting, by said hardware element, said aggregate determinative acknowledgement signal on a path toward said originator.

8. An acknowledgement-determination system, comprising:

a first hardware element adapted to determine a local acknowledgement for a message; and a second hardware element adapted to determine an aggregate determinative signal to be further transmitted, said aggregate determinative signal being representative of:

said local acknowledgement; and least one of:

one or more collected intended recipient acknowledgements for said message; and one or more collected determinative signals of intended recipient acknowledgements for said message.

9. The system of claim 8, wherein said first hardware element is adapted to determine said local acknowledgement according to whether an indication of broadcasting appears for said message.

10. The system of claim 9, wherein said second hardware element is adapted to determine said aggregate determinative signal according to whether said indication appears for said message.

11. The system of claim 8, wherein said first hardware element is a controller of local memory and wherein said second hardware element is a controller of a routing mechanism.

12. The system of claim 8, wherein said first hardware element and said second hardware element are the same hardware element.

13. A broadcast-acknowledgement system, comprising:

an originator adapted to originate a message; and a hardware element adapted to determine an aggregate determinative acknowledgement signal for a subset of a plurality of intended recipients for said message broadcast from said originator, wherein said hardware element is further adapted to transmit said aggregate determinative acknowledgement signal on a path toward said originator.

* * * * *